Aug. 26, 1947.  N. SUGARMAN  2,426,248
MANUFACTURE OF CARBON TRANSFER INK
Filed July 1, 1944.
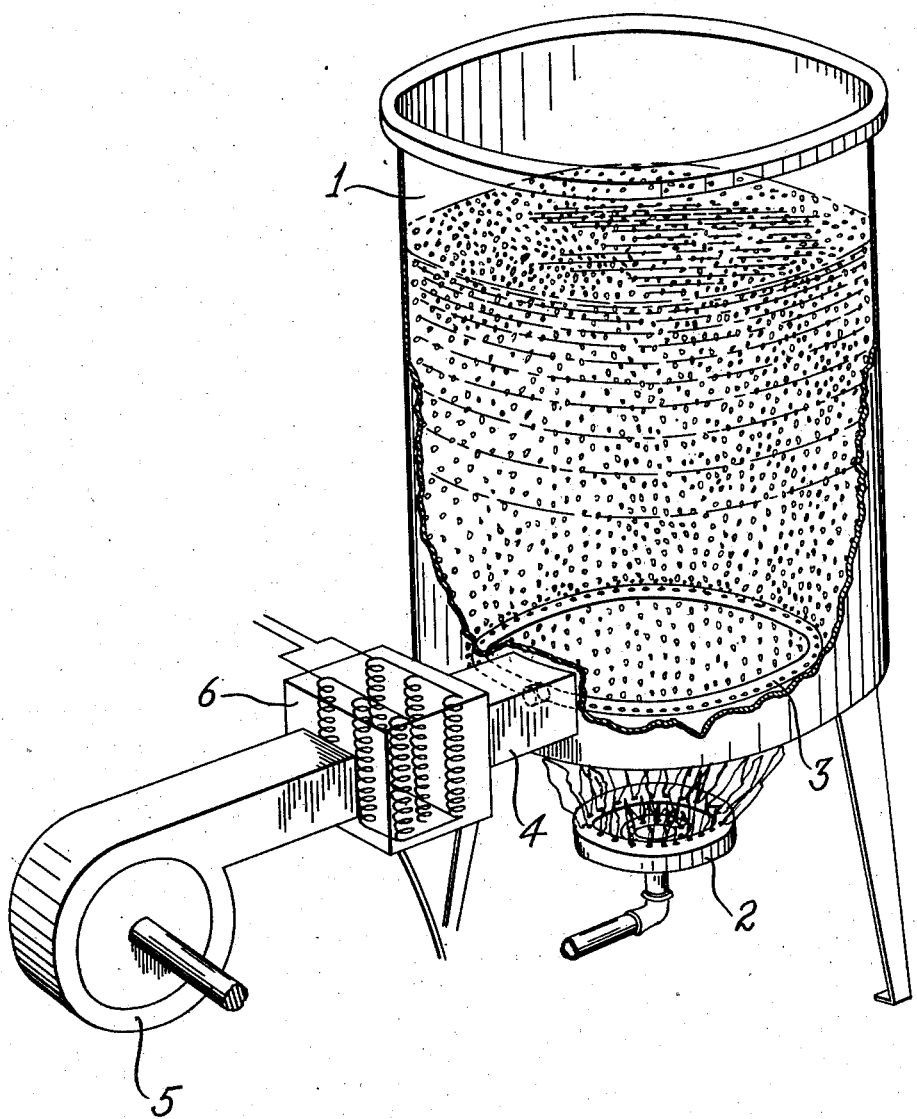
INVENTOR
NATHAN SUGARMAN
BY
ATTORNEY Patented Aug. 26, 1947

2,426,248

UNITED STATES PATENT OFFICE 2,426,248

MANUFACTURE OF CARBON TRANSFER INK

Nathan Sugarman, Dayton, Ohio, assignor to The Standard Register Company, Dayton, Ohio, a corporation of Ohio Application July 1, 1944, Serial No. 543,175

13 Claims. (Cl. 106—23)

This invention pertains to manufacture of carbon transfer inks, and more particularly to the use therein of oxidized vegetable and mineral waxes.

In compounding carbon transfer inks, wherein waxes and oils are incorporated with pigment or dye stuffs, such as carbon black, it has been recognized that presence of certain waxes are necessary to impart a degree of dispersion and fluidity to the mixture. These were generally carnauba, oricury and reed waxes. However, certain vegetable waxes of considerable commercial importance, of which candelilla wax is one example, were found to lack sufficient dispersive powers possessed by the other waxes previously mentioned. It was also known that mineral waxes, such as paraffin, ozokerite and analogous waxes, possessed little or no dispersive powers whatever.

Investigation of the action of various waxes in carbon transfer ink formulations, and correlation of their effects with known chemical constitution of the waxes under test, disclosed that the basic property necessary to obtain fluidity and high degree of dispersion was the presence of a sufficient concentration of long chain fatty acids.

It was then found upon trial that when ordinary paraffin mineral wax, which had been subjected to oxidation to produce fatty acids therein, was used in a carbon transfer ink formulation, a satisfactory degree of fluid dispersion was obtained, whereas unoxidized paraffin wax when used in a like formulation failed to afford a fluid dispersion. Likewise, similar tests made with oxidized candelilla vegetable wax in a carbon transfer ink formulation demonstrated that the dispersive powers of such wax were greatly enhanced, and that fluid inks were produced which were unobtainable prior to oxidation of the wax.

The object of the invention is to improve the quality and desirable characteristics of carbon transfer inks, whereby they may not only be economically manufactured, but will possess improved oil-wax structure and greatly enhanced pigment dispersion and fluidity characteristic as a result of incorporation of oxidized vegetable or mineral wax.

A further object of the invention is the more general utilization of vegetable and mineral waxes in manufacture of carbon transfer inks.

A further object of the invention is the production of a carbon transfer ink mixture possessing the advantageous structural features and inherent meritorious characteristics herein set forth and of the herein described process of producing same.

With the above primary and other objects in view as will more fully appear in the specification, the invention intended to be protected by Letters Patent consists of the discovery of the properties imparted to vegetable and mineral waxes by oxidation thereof, and the utilization of oxidized vegetable and mineral waxes, which contain fatty acids of chain lengths of from twenty to thirty carbon atoms, and the properties thereof in compounding of carbon transfer inks to impart the properties of dispersion and fluidity and improve the structure of such wax-oil compositions, and the process of preparation thereof or their equivalents, as hereinafter described.

For illustrative purpose, but with no intent to thereby limit the scope or application of the invention, there is shown in the drawing a somewhat diagrammatic view of a suggested apparatus, but not necessarily the only form of embodiment thereof, for performing the herein described method of wax oxidation.

Briefly stated, the present method consists in melting the wax at a relatively high temperature, between the melting point and the flash point of the wax, into which an oxidation catalyst is introduced in a concentration which may vary between zero and ten per cent (10%) of the quantity of wax, and simultaneously bubbling through the melted wax heated air, the temperature of which is substantially that of the melted wax, and subsequently combining the resulting oxidized wax with ink making materials to produce a carbon transfer ink.

Referring to the drawing, 1 is a reaction tank supplied with heating means 2. In the bottom of the tank and hence submerged in the melted wax content thereof, is a perforated coil or ring 3 through which a stream of air is uniformly distributed throughout the cross area of the tank 1, which air supply is permitted to bubble upwardly through the melted wax to agitate the wax and equalize the heat thereof, and thereby uniformly reduce the wax to a liquid state. The perforated distributing coil or ring 3 is connected by a supply conduit 4 with a power blower 5, which supplies air under pressure to the bottom of the tank. Intermediate the blower 5 and the tank 1 the air is passed through a heater unit 6, by which the temperature of the air is raised to approximately that of the melted wax within the tank.

The conditions of time, temperature and volume of air may be varied to agree with the characteristics of the particular wax being treated and to produce particular properties desired. Various catalysts may be employed, including manganese and cobalt linoleates, naphthenates and resinates, and other commonly used paint driers, also salts and oxides of cobalt, nickel, iron and other metals which exist in more than one valence state. The progress of the oxidation process may be followed by the determination of the acid and saponification numbers of the wax which increase with the increasing degree of oxidation.

As one example of the process wax oxidation and its result, two thousand pounds of candelilla wax is melted in the tank 1 at an approximate temperature of three hundred to three hundred ten degrees Fahrenheit, to which is added twenty pounds of manganese acetate to serve as a catalyst, while air at a temperature of substantially three hundred five degrees Fahrenheit is bubbled therethrough for a period of approximately six hours at an approximate rate of fifty-five cubic feet per square foot of cross sectional area of the tank.

The bubbling of the air through the molten wax at a high temperature not only effects oxidation of the wax, but in addition thereto it eliminates from the mass a considerable proportion of the resinous content thereof, thus eliminating to a major degree the tackiness of the resulting compositions in which the wax may be used. In addition to reducing the resinous content, it also increases the fatty acid content of the wax, which increases its dispersive properties.

Without the above described treatment, if two parts of unoxidized candelilla wax and one part of low viscosity petroleum oil (carbon paper oil) are heated together and allowed to solidify, the resulting composition has a fair resistance to fracture or snap, but when crushed between the fingers it becomes of a soft and putty-like consistency and is very tacky. Such unoxidized candelilla wax when mixed with usual dye stuffs which function as dispersing as well as toning agents, does not allow dispersion of carbon black, and a highly viscous, thick, gummy mixture results.

To the contrary, a similar mixture of oxidized candelilla wax and low viscosity petroleum oil has a good snap, is hard, and when crushed the mixture crumbles into small dry particles with very slight tackiness, which property is of great importance in formulation of carbon inks. The oxidation process herein described imparts to candelilla wax the ability to form fluid dispersions of carbon black in a fluid mixture of a satisfactory carbon ink of which candelilla wax comprises the principal ingredient.

The oxidation process improves the wax-oil structures of mineral waxes. Ordinary paraffin waxes after being subjected to oxidation by the present method can be used to prepare fluid dopes. Unoxidized paraffin waxes have no such dispersing properties, and their use without the presence of certain vegetable waxes results only in thick, viscous unusable mixtures.

Heretofore paraffin has been oxidized, generally to obtain a high yield of fatty acids for soap making, which resulted in considerable degradation and softening of the waxes. In the present process of oxidation of waxes for manufacture of carbon transfer inks, the degree of oxidation is held to a minimum to reduce the amount of softening of the wax and still obtain the required amount of fatty acids necessary for dispersion of the carbon black. However, the use of oxidized waxes in inks is not limited by the degree of oxidation.

The following examples of carbon transfer ink formulations are here given merely for illustrative purpose, and are not intended as limitations or restrictions of the invention:

Example I

Fifteen hundred grams of paraffin containing 1% manganese naphthenate was oxidized by blowing with air for eight hours at a temperature of two hundred sixty to two hundred seventy degrees Fahrenheit.

A carbon ink was made as follows:

|  | Per cent |
|---|---|
| Oxidized paraffin | 68.5 |
| "Stanoline" | 15.0 |
| Oleic acid | 3.0 |
| Methyl violet | 1.0 |
| Wetting agent | 1.0 |
| Carbon black | 12.0 |

The viscosity of this ink at one hundred ninety degrees Fahrenheit was two hundred ninety-six centipoises. If plain unoxidized paraffin had replaced the oxidized wax, the composition would have been a thick sticky viscous mass.

Example II

Twenty-five pounds of candelilla wax containing 1% manganese acetate was oxidized by blowing with air for six hours at a temperature of three hundred degrees centigrade.

A carbon transfer ink was made as follows:

|  | Per cent |
|---|---|
| Oxidized candelilla | 33.0 |
| Paraffin | 8.0 |
| "Stanoline" | 4.0 |
| Petroleum oil | 39.25 |
| Oleic acid | 2.2 |
| Methyl violet | 1.0 |
| Carbon black | 12.55 |

The viscosity of this ink was forty-eight centipoises. If unoxidized candelilla were used, the ink would have a consistency like thick mud.

The component "Stanoline" in the above examples is the trade name designation of petroleum hydrocarbon, having a viscosity at 210° F. of 39-42 seconds.

Having thus described my invention, I claim:

1. In the manufacture of carbon transfer inks, the step of intermixing an oxidized vegetable wax, which contains fatty acids of chain lengths of from twenty to thirty carbon atoms, into carbon black, in a low viscosity petroleum oil, producing an increase in the dispersion of the carbon black therein and an increase in the fluidity of the product, affording a fluid dispersion.

2. In the manufacture of carbon transfer inks, the step of intermixing an oxidized wax, which contains fatty acids of chain lengths of from twenty to thirty carbon atoms, into carbon black, in a low viscosity petroleum oil, producing an increase in the dispersion of the carbon black therein and an increase in the fluidity of the product, affording a fluid dispersion.

3. In the manufacture of carbon transfer inks, the step of intermixing an oxidized mineral wax, which contains fatty acids of chain lengths of from twenty to thirty carbon atoms, into carbon black, in a low viscosity petroleum oil, producing an increase in the dispersion of the carbon black therein and an increase in the fluidity of the product, affording a fluid dispersion.

4. In the manufacture of carbon inks, the step of incorporating an oxidized wax, which contains fatty acids of chain lengths of from twenty to thirty carbon atoms, with carbon black and low viscosity petroleum oil, producing an increase in the dispersion of the carbon black therein and the fluidity of the product, affording a fluid dispersion.

5. In the manufacture of carbon inks, the step of incorporating an oxidized vegetable wax, which contains fatty acids of chain lengths of from twenty to thirty carbon atoms, into carbon black in oil, producing an increase in the dispersion of the carbon black therein and the fluidity of the product, affording a fluid dispersion.

6. In the manufacture of carbon inks, the step of incorporating an oxidized mineral wax, which contains fatty acids of chain lengths of from twenty to thirty carbon atoms, into carbon black in oil, producing an increase in the dispersion of the carbon black therein and the fluidity of the product, affording a fluid dispersion.

7. In the manufacture of carbon inks, the step of incorporating an oxidized candelilla wax, which contains fatty acids of chain lengths of from twenty to thirty carbon atoms, into carbon black in oil, producing an increase in the dispersion of the carbon black therein and the fluidity of the product, affording a fluid dispersion.

8. In the manufacture of carbon inks, the step of incorporating an oxidized wax, which contains fatty acids of chain lengths of from twenty to thirty carbon atoms, into carbon black in oil, producing an increase in the dispersion of the carbon black therein and the fluidity of the product, affording a fluid dispersion.

9. In the manufacture of carbon transfer inks, the step of incorporating an oxidized wax, which contains fatty acids of chain lengths of from twenty to thirty carbon atoms, into a carbon black ink formulation containing a low viscosity petroleum hydrocarbon, securing both a decrease in the resinous content thereof and an increase in the dispersion of carbon black, affording a fluid dispersion.

10. In the manufacture of carbon inks, the step of intermixing oxidized paraffin, which contains fatty acids of chain lengths of from twenty to thirty carbon atoms, into carbon black, in petroleum oil, producing an increase in the dispersion of the carbon black therein and an increase in the fluidity of the product, affording a fluid dispersion.

11. In the manufacture of carbon inks, the step of intermixing oxidized paraffin, which contain fatty acids of chain lengths of from twenty to thirty carbon atoms, into carbon black, in a low viscosity petroleum oil, producing an increase in the dispersion of the carbon black therein and an increase in the fluidity of the product, affording a fluid dispersion.

12. In the manufacture of carbon inks, the step of intermixing an oxidized mineral wax, which contains fatty acids of chain lengths of from twenty to thirty carbon atoms, with a low viscosity petroleum hydrocarbon, a higher fatty acid below twenty carbon atoms, an organic dye and carbon black, producing an increase in the dispersion of the carbon black therein and the fluidity of the product.

13. In the manufacture of carbon inks, the step of intermixing oxidized candelilla wax, which contains fatty acids of chain lengths of from twenty to thirty carbon atoms, with a low viscosity petroleum hydrocarbon, paraffin, a higher fatty acid below twenty carbon atoms, an organic dye and carbon black, producing an increase in the dispersion of the carbon black, therein and the fluidity of the product.

NATHAN SUGARMAN.

REFERENCES CITED

The following references are of record in the file of this patent:

UNITED STATES PATENTS

| Number | Name | Date |
| --- | --- | --- |
| 2,022,276 | Dixon et al. | Nov. 26, 1935 |
| 1,739,582 | Ellis | Dec. 17, 1929 |
| 1,524,874 | Marston et al. | Feb. 3, 1925 |

OTHER REFERENCES

"The Chemistry of Petroleum Derivatives," Ellis, 1934, Chemical Catalog Co., Inc., New York, pages 994, 995 and 997. (Copy in Div. 64.)